US008902398B2

(12) United States Patent
Sakai (10) Patent No.: US 8,902,398 B2
(45) Date of Patent: Dec. 2, 2014

(54) OPTICAL FILM LAMINATE, METHOD FOR PRODUCING THE SAME, AND LIQUID CRYSTAL DISPLAY PANEL USING THE SAME

(75) Inventor: Takeya Sakai, Nagoya (JP)

(73) Assignee: Hayashi Engineering Inc., Nagoya-shi (JP)

( * ) Notice: Subject to any disclaimer, the term of this patent is extended or adjusted under 35 U.S.C. 154(b) by 144 days.

(21) Appl. No.: 13/491,927

(22) Filed: Jun. 8, 2012

(65) Prior Publication Data

US 2012/0314159 A1    Dec. 13, 2012

(30) Foreign Application Priority Data

Jun. 9, 2011  (JP) ................................. 2011-129107
Aug. 29, 2011  (JP) ................................. 2011-186395

(51) Int. Cl.
G02F 1/13        (2006.01)
G02F 1/1335      (2006.01)
G02F 1/13363     (2006.01)
G02F 1/1337      (2006.01)

(52) U.S. Cl.
CPC ........ *G02F 1/13363* (2013.01); *G02F 2413/06* (2013.01); *G02F 1/133632* (2013.01); *G02F 2413/02* (2013.01); *G02F 2202/023* (2013.01); *G02F 2001/133633* (2013.01); *G02F 2001/133726* (2013.01); *G02F 1/133634* (2013.01)
USPC ............................. 349/187; 349/119; 349/118

(58) Field of Classification Search
CPC ...................... G02F 1/133528; G02F 1/13363; G02F 1/13364; G02F 1/1393; G02F 2413/02; G02F 2413/08; G02F 2413/11; G02F 2413/12; G02F 2413/13; G02F 2202/28; G02F 1/133632; G02F 1/133634; G02B 5/30; G02B 5/3016; G02B 5/3025; G02B 5/3041; G02B 5/3083; G02B 1/08; G02B 1/10; B05D 5/06; C09K 2019/0448; C09K 19/38; C09K 19/42; B29C 65/4825; B29D 11/0073; B29D 11/00644; B29K 2995/0034; B29L 2009/00; B32B 37/1284; B32B 7/12; C09J 7/0207; C09J 7/0246; C09J 2201/606; C09J 2205/302
USPC ........... 349/117–119, 96, 122, 193, 194, 123, 349/187; 428/1.1, 1.5; 252/299.01; 353/8; 430/20
See application file for complete search history.

(56) References Cited

U.S. PATENT DOCUMENTS 6,115,095 A    9/2000 Suzuki et al.
6,743,487 B2   6/2004 Sakai et al.
(Continued)

FOREIGN PATENT DOCUMENTS

JP   11-133408 A   5/1999
JP   11-189665 A   7/1999
(Continued)

OTHER PUBLICATIONS

Lu, Ruibo, et al., "An O-Plate Compensated In-Plane Switching Liquid Crystal Display," Journal of Display Technology, Sep. 2006, pp. 223-232, vol. 2, No. 3.

*Primary Examiner* — Thoi Duong
(74) *Attorney, Agent, or Firm* — Sughrue Mion, PLLC (57) ABSTRACT

Provided is an optical film laminate with a thinner thickness having an optical compensation function. According to the present invention is provided an optical film laminate comprising (i) a positive C plate comprising a liquid crystal material having a photosensitive group and (ii) a positive A plate, an optically biaxial plate, or an O plate, these plate comprising a liquid crystal material having a photosensitive group; wherein the both plates are directly bonded with each other to be firmly laminated without adhesive.

5 Claims, 2 Drawing Sheets

(56) References Cited

U.S. PATENT DOCUMENTS

| | | |
|---|---|---|
| 7,227,602 B2 | 6/2007 | Jeon et al. |
| 7,327,432 B2 * | 2/2008 | Skjonnemand ............... 349/168 |
| 8,094,271 B2 * | 1/2012 | Aiki et al. ..................... 349/117 |
| 2002/0128341 A1 | 9/2002 | Sakai et al. |
| 2005/0140900 A1 | 6/2005 | Jeon et al. |
| 2006/0192913 A1 * | 8/2006 | Shutou et al. ................ 349/117 |
| 2008/0151165 A1 * | 6/2008 | Takemoto ..................... 349/118 |

FOREIGN PATENT DOCUMENTS

| | | |
|---|---|---|
| JP | 2002-202409 A | 7/2002 |
| JP | 2004-170595 A | 6/2004 |
| JP | 2005-070097 A | 3/2005 |
| JP | 2005-232345 A | 9/2005 |
| JP | 2009-122715 A | 6/2009 |
| JP | 4592005 B2 | 12/2010 |

* cited by examiner

OPTICAL FILM LAMINATE, METHOD FOR PRODUCING THE SAME, AND LIQUID CRYSTAL DISPLAY PANEL USING THE SAME

CROSS REFERENCE TO THE RELATED APPLICATIONS

This application is based on and claims Convention priority to Japanese patent applications No. 2011-129107 and No. 2011-186395, filed Jun. 9, 2011 and Aug. 29, 2011, respectively, the entire disclosures of which are herein incorporated by reference as a part of this application.

FIELD OF THE INVENTION

This invention relates to an optical film laminate used for a liquid crystal display, a method for producing the same, and a liquid crystal display panel using the same, and in particular, relates to an optical film laminate having an optical compensation function to improve viewing angle characteristics of the liquid crystal display, a method for producing the same, and a liquid crystal display panel using the same.

BACKGROUND ART

Liquid crystal displays are required for having a wider viewing angle as well as a higher contrast ratio. Liquid crystal displays (LCDs) of IPS (In-plane Switching: IPS) mode are mentioned as such a liquid crystal display. However, in such a liquid crystal display, when watching is carried out from an oblique angle through two polarizing plates configured on the front and rear surfaces of the liquid crystal display, respectively, and crossing at right angle to each other, the apparent absorption axes of two polarizing plates shift from the right angle. Such an apparent absorption axis shift leads to a trouble that optical leakage is caused at the time of black display so as to reduce the contrast of the display.

In order to cope with such a trouble, Patent Document 1 proposes a method based on simulation results, the method to improve viewing angle of IPS-LCD in a viewing direction by mounting a first compensation layer (positive C plate) having a positive uniaxially optical anisotropy, the optical axis extending in the perpendicular direction (the z direction) to a substrate surface, and a second compensation layer (positive A plate) having positive uniaxially optical anisotropy, the optical axis extending in the direction parallel to the substrate surface.

Patent Document 2 proposes a configuration comprising a stretched film, a layer (positive A plate) comprising a liquid crystal material and having an in-plane uniaxial property, and a homeotropic layer (positive C plate) comprising a liquid crystal material.

Furthermore, Patent Document 3 proposes a configuration comprising a positive A plate comprising a solidified or cured layer of a liquid crystal composition having a homogeneous alignment, and a positive C plate comprising a solidified or cured layer of a liquid crystal composition having a homeotropic alignment.

On the other hand, in IPS-LCD, from the viewpoint of being advantageous to the improvement of response speed, an attempt to give a pre-tilt angle to a liquid crystal material has been made. Non-patent document 1 has proposed by using a simulation that deterioration in viewing angle characteristics caused by the generated pre-tilt angle is improved by mounting being a first optical compensation layer, being a positive C plate, and a second optical compensation layer having a positive uniaxial optical anisotropy, and being tilt-aligned.

As such a combination of a positive C plate and a tilt alignment layer, it is possible, as is proposed in conventional technique, to use a liquid crystal film which is perpendicularly aligned by UV cure as a positive C plate, and a liquid crystal film, as a tilt alignment layer, being subjected to tilt alignment or bend alignment by the means of an electric field, a magnetic field, or an oriented film, followed by fixation of the alignment. Patent Document 4 discloses, as means to laminate a positive C plate and a tilt alignment layer to mount on an IPS-LCD panel, a method of filling an adhesive or glue in the gap between two optical elements so as to form a layer.

[Patent Document 1] JP Laid-open Patent Publication No. 11-133408
[Patent Document 2] JP Laid-open Patent Publication No. 2009-122715
[Patent Document 3] JP Patent No. 4592005
[Patent Document 4] JP Laid-open Patent Publication No. 2005-70097
[Non Patent Document 1] Journal of Display Technology, Vol. 2, No. 3 (published in September 2006).

DISCLOSURE OF THE INVENTION

The Problems to be Solved by the Invention

Patent Document 1 neither mentions concrete film configuration nor shows Examples. Moreover, although Patent Document 2 describes in Example an embodiment to use a stretched PC (polycarbonate) or COP (cycloolefinic polymer) film as a positive A plate and a liquid crystal film being perpendicularly-aligned by UV cure as a positive C plate, there is no mention about means to laminate them and fix. Although Patent Document 3 proposes to use a solidified or cured layer of a liquid crystal composition to make a liquid crystal display thinner, this document describes a method of filling an adhesive or glue in form of a layer in the gap between each of the optical elements (a polarizing plate, a positive A plate, a positive C plate, and liquid crystal cell) to laminate. According to the above methods, however, although it may be possible to make the thickness of the positive A plate and the positive C plate thinner, an adhesive or glue layer cannot be omitted in order to adhere or glue them. Accordingly, the problem that the total thickness is increased by the thickness of the adhesive or glue layer is still remained, resulting in failing to achieve completely thinner display.

As is proposed in the above-mentioned non-Patent Document 1, the combination of a positive C plate and a tilt alignment layer (O plate) needs to use an adhesive or glue in order to laminate the positive C plate and the tilt alignment layer as disclosed in Patent Document 4. In such a case, total thickness of the laminate is increased due to the thickness of the adhesive or glue layer and causes trouble that personal digital assistant devices which are especially required to be thin inevitably become thick because of the adhesive or glue layer when such an LCD panel is mounted.

Accordingly, in view of the problems of such conventional technology, an object of the present invention is to provide an even thinner optical compensation film layer comprising (i) a positive C plate and (ii) a positive A plate, an optically biaxial plate, or an O plate.

Another object of the present invention is to provide a method of producing a thinner optical compensation film.

Further object of the present invention is to provide a liquid crystal display panel using the thinner optical compensation film.

Means of Solving the Problems

As a result of intensive studies conducted by the inventor of the present invention in an attempt to solve the problem of the conventional technology, it has been found that a positive C plate is directly bonded and laminated to a positive A plate, an optically biaxial plate, or an O plate without adhesive nor glue (hereafter, in the present specification, adhesives and glues may be simply named as adhesive as a generic name), and thus he finally completed the invention.

That is, the first embodiment of the present invention provides an optical film laminate comprising (i) a positive C plate comprising a liquid crystal material having a photosensitive group and (ii) a positive A plate, an optically biaxial plate, or an O plate each of which is formed from a liquid crystal material having a photosensitive group, wherein the positive C plate is directly bonded and laminated to the positive A plate, the optically biaxial plate, or the O plate without adhesive.

The positive C plate may comprise preferably a homeotropic alignment layer.

The positive A plate may be preferably a positive uniaxial birefringent layer aligned in the in-plane direction of the film. The optically biaxial plate may be preferably a biaxial birefringent layer in which the largest axis of the index ellipsoid in the layer is in the in-plane direction of the film.

The O plate may be a uniaxial or biaxial birefringent layer (excluding the layer in which the largest axis of the index ellipsoid is neither in the in-plane direction of the film nor in the normal direction of the film).

The second embodiment of the present invention provides a liquid crystal display panel comprising a polarizing plate and the above-mentioned optical film laminate.

In the above-mentioned liquid crystal display panel, when (i) a polarizing plate, (ii) a positive C plate, (iii) a positive A plate, an optically biaxial plate, or O plate, and (iv) a liquid crystal cell are mounted in this order, it is desirable that the in-plane slow axis of the positive A plate, the optically biaxial plate, or the O plate is parallel to the absorption axis of the polarizing plate; when (i) a polarizing plate, (ii) a positive A plate, an optically biaxial plate, or O plate, (iii) a positive C plate, and (iv) a liquid crystal cell are mounted in this order, it is desirable that the in-plane slow axis of the positive A plate, the optically biaxial plate, or O the plate lies at right angle (perpendicular) to the absorption axis of the polarizing plate.

The third embodiment of the present invention provides a method for producing an optical film laminate comprising:

providing a positive C plate (layer A) comprising a homeotropic alignment layer of a liquid crystal material (material A) having a photosensitive group, the layer not being subjected to fixation of alignment;

forming on the positive C plate a positive A plate, an optically biaxial plate, or an O plate (layer B) of a liquid crystal material (material B) having a photosensitive group, to obtain a laminate of the layer A and the layer B, irradiating an un-polarized UV light to the laminate so as to fix the alignment in the layer A and the layer B, as well as directly laminate and bond both layers without adhesive.

The layer A is preferably formed by applying a solution dissolving the material A in a solvent on a support film to form an coated layer, followed by drying (desolvation) and heating the coated layer. Moreover, the above-mentioned layer B is preferably formed by applying a solution dissolving the material B in a solvent on the layer A to form a coated layer, followed by drying, and subsequently irradiating a linear polarized UV light.

Preferably the photosensitive groups of both materials A and B are a photosensitive group which reacts with each other when exposed to light, and more preferably the photosensitive groups of both material A and material B are the same photosensitive group.

Effect of the Invention

According to the first embodiment of the present invention, since the optical film laminate is obtained by laminating the positive C plate with the positive A plate, the optically biaxial plate, or the O plate to be directly bonded without adhesives, the optical film laminate can be used as a thinner optical compensation film. Because of the contact adhesion of the positive C plate with the positive A plate, the optically biaxial plate, or the O plate, without separating from each other, an optical compensation film can achieve high durability.

According to the second embodiment of the present invention, in the liquid crystal display panel comprising a polarizing plate and the above-mentioned optical film laminate, since the in-plane slow axis of the above-mentioned A plate, the optically biaxial plate, or the O plate is perpendicular or parallel to the absorption axis of the polarizing plate, transmitted light does not experience the phase difference when the liquid crystal display panel is viewed from front. The optical leakage can be decreased when viewed at an oblique angle through two polarizing plates crossing at right angle to each other.

According to the third embodiment of the present invention, since a positive A plate, an optically biaxial plate, or an O plate is bonded to a positive C plate without adhesive so as to provide an optical film laminate in which both layers is hardly separated from each other, a liquid crystal display with reduced thickness can be obtained. In such an embodiment, since lamination of a positive C plate to a positive A plate, an optically biaxial plate, or an O plate can be performed in a series of processes without adhesive, there is no contamination of foreign matter which is easy to adhere to an adhesive-applied surface. As a result, an efficient production line with a low product defect rate can be established.

According to the present invention, when both the photosensitive groups of materials A and B are a photosensitive group which reacts with each other when exposed to light, preferably when the photosensitive groups of both material A and material B are the same photosensitive group; the photosensitive groups of materials A and B tend to be bonded by the photo-reaction in the interface between the layer A and the layer B constituting both plates, so as to achieve a still firmer adherence configuration.

BRIEF DESCRIPTION OF THE DRAWINGS

In the accompanying drawings, like reference numerals are used to denote like parts throughout a plurality of drawings.

DETAILED DESCRIPTION OF THE INVENTION (Basic Configuration of Optical Film Laminate)

The optical film laminate of the present invention comprises a laminate of (i) a positive C plate, and (ii) a positive A plate, an optically biaxial plate, or an O plate.

In the present specification, the term "positive C plate" means a positive uniaxial retardation optical element which satisfies a refractive index distribution of nz>nx=ny, wherein the principal indices of refraction in the plane of the plate are defined as nx (the direction of slow axis) and ny (the direction of fast axis), respectively, and the principal index of refraction in the thickness direction of the plate is defined as nz. Such a positive C plate comprises a homeotropic alignment layer formed from a liquid crystal material having a photosensitive group.

In the present specification, the term "positive A plate" means a positive uniaxial retardation optical element which satisfies a refractive index distribution of nx>ny=nz. Such a positive A plate is formed from a liquid crystal material having a photosensitive group, and usually comprises a homogeneous alignment layer.

In the present specification, the term "optically biaxial plate" means a biaxial retardation optical element which satisfies a refractive index distribution of nx≠ny≠nz, including nx>nz>ny, nx>ny>nz, etc.

In the present specification, the term "O plate" means a plate having an inclined optical axis both in the in-plane direction and in Z-axis direction (the thickness direction perpendicular to the in-plane direction). Such an O plate is formed from a liquid crystal material having a photosensitive group, and usually comprises a tilt alignment layer in which the optical axis of the liquid crystal is tilt-aligned.

In the present invention, the above-mentioned positive C plate is laminated to the positive A plate, the optically biaxial plate, or the O plate to be directly bonded without adhesive, so that the layers of the laminate are not separated from each other. By forming a positive C plate as well as a positive A plate, an optically biaxial plate, or an O plate in the specific method disclosed below, an optical film laminate which does not cause layer separation can be obtained even without adhesive.

Figure 1:
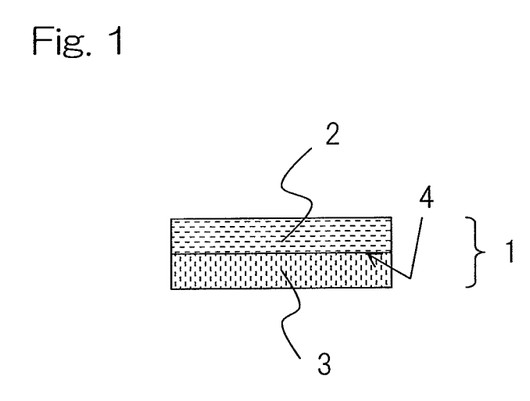
FIG. 1 is a schematic view showing an example of the optical film laminate (a positive C plate and a positive A plate or an optically biaxial plate) of the present invention.

FIG. 1 is a sectional view showing an example of the optical film laminate of the present invention. In the optical film laminate 1 of the present invention, a positive A or optically biaxial plate 2 is laminated to a positive C plate 3 without adhesive, to be directly bonded in the interface 4.

Figure 2:
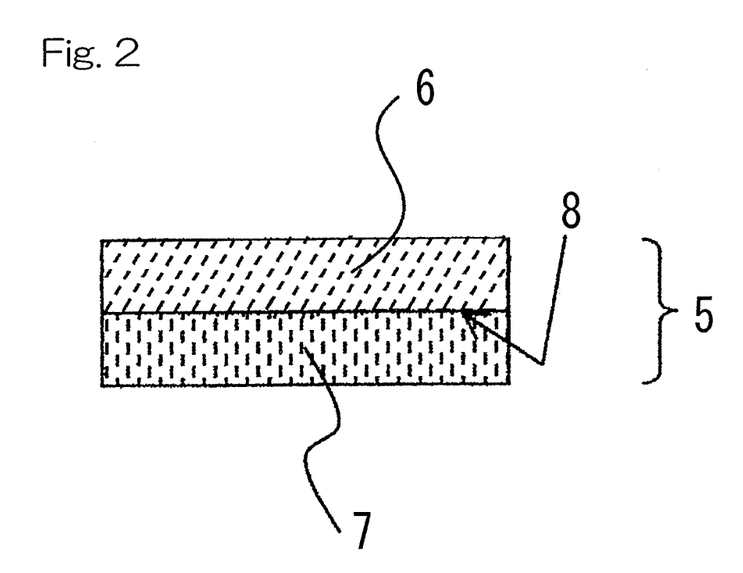
FIG. 2 is a schematic view showing another example of the optical film laminate (a positive C plate and an O plate) of the present invention.

FIG. 2 is a figure showing another example of the optical film laminate of the present invention. In the optical film laminate 5 of the present invention, a positive C plate (homeotropic alignment layer) 7 is laminated to an O plate (tilt alignment layer) 6 without adhesive, to be directly bonded in the interface 8.

(Positive C Plate)

In the present invention, the positive C plate comprises a homeotropic alignment layer formed from a liquid crystal material having a photosensitive group. Here, the term "homeotropic alignment" means a state in which liquid crystal materials in the plate are uniformly aligned in parallel to the normal line of the plate, i.e., the state where the liquid crystal materials in the plate are aligned in the direction of perpendicular to the plate surface. The liquid crystal material capable of homeotropic alignment may be a liquid crystal polymer, or a liquid crystal monomer.

(Positive A Plate)

In the present invention, the positive A plate comprise a homogeneous alignment layer formed from a liquid crystal material having a photosensitive group. Here, the homogeneous alignment is defined as the state that liquid crystal materials are aligned in the same direction (optical uniaxial property) and in parallel to the film plane. The liquid crystal material capable of homogeneous alignment may be a liquid crystal polymer, or a liquid crystal monomer.

(Optically Biaxial Plate)

In the present invention, the optically biaxial plate comprises a layer formed from a liquid crystal material having a photosensitive group, in which the liquid crystal material is biaxially aligned in the in-plane direction of the film. The liquid crystal material capable of biaxial alignment may be a liquid crystal polymer, or a liquid crystal monomer.

(Optical Alignment Layer)

Since the above-mentioned positive A plate (optical uniaxiality) and the optically biaxial plate are an optical alignment layer in which a mesogenic group is aligned in a surface to show an optically-anisotropic property, they may be called as an optical alignment layer in the following description.

(O Plate)

In the present invention, the term "O plate" means a tilt alignment layer formed from a liquid crystal material having a photosensitive group, in which the liquid crystal material is aligned in the inclined direction (the degree of tilt angle is larger than 0 degree and smaller than 90 degrees) to the film plane.

The O plate may be a uniaxial or biaxial birefringent layer (however, the largest axis of the index ellipsoid is neither in the in-plane direction of the film nor in the normal direction of the film). The liquid crystal material capable of obtaining tilt alignment may be a liquid crystal polymer, or a liquid crystal monomer.

(Liquid Crystal Material Having a Photosensitive Group)

In the present invention, examples of a liquid crystal material having a photosensitive group used in the present invention in order to form a positive C plate (homeotropic alignment layer), a positive A plate (homogeneous alignment layer), an optically biaxial plate, and an O plate may be a photosensitive side chain liquid crystal polymer having a side chain including the structure in which (i) any of cinnamoyl group, chalcone group, cinnamylidene group, biphenylacryloyl group, furylacryloyl group, naphthylacryloyl group or the derivatives thereof is bonded to (ii) a substituent frequently used as a mesogenic component of liquid-crystal polymer, such as biphenyl, terphenyl, phenyl benzoate, and azobenzene, either through or not through a spacer. It should be noted that a polymer exhibiting liquid crystal property without mesogenic groups is also preferably used in the present invention. Such a polymer does not comprise a mesogenic group at the side chain in the polymer structure, but comprises a photosensitive side chain having a carboxyl group at the side chain terminal so as to form a rigid structure by dimerization involving the hydrogen bonding between the carboxyl groups at the side chain terminals. As a main chain constituting the above-mentioned photosensitive side chain liquid crystal polymer, there may be mentioned a hydrocarbon, an acrylate, a methacrylate, a siloxane, a maleimide, an N-phenylmaleimide, etc. bonding to the side chain through the spacer. These polymer may be any of a homopolymer comprising the same repeating unit, a copolymer comprising a plurality of repeating units, each having a side chain different in chemical structure from each other, or a copolymer comprising a unit having a side chain comprising a photosensitive group and a unit having a side chain without a photosensitive group wherein the latter unit may be contained to a degree that the copolymer holds liquid crystallinity. It should be noted that in the present invention the term "photosensitive group" means a functional group bonding to another molecule by light irradiation. Moreover, in the present invention the term "liquid crystal material" means that a material which shows liquid crystallinity when a physical external stimulus (heating, cooling, electric field, magnetic field, application of shearing, etc.) is given to the material alone, or exhibits liquid crystallinity when the material is mixed with a solvent or a non-liquid-crystal component.

Furthermore, in order to raise a heat-resisting property, the polymer may be a polymer to which a reactive group is introduced, followed by being crosslinked with a crosslinking agent such as an isocyanate material and an epoxy material to a degree that the polymer remains liquid crystallinity, or may comprise a crosslinked polymer polymerized by adding a bifunctional low molecular compound as the below-mentioned low molecular compound.

(Formation of Homeotropic Alignment Layer, Optical Alignment Layer, and Tilt Alignment Layer)

In the present invention, the homeotropic alignment layer can be produced by forming a film from a solution dissolving the above-mentioned liquid crystal material (liquid crystal polymer), preferably the liquid crystal material (liquid crystal polymer) shown in the below-mentioned chemical formulae C1 to C3, in a solvent, followed by removing the solvent and heating the desolvated film.

In the present invention the optical alignment layer can be produced by forming a film from a solution dissolving a composition comprising the above-mentioned liquid crystal material (liquid crystal polymer) and if necessary a low molecular compound described below in a solvent, followed by removing the solvent, irradiating a linear polarized UV light from the direction perpendicular to the film, and heating the irradiated film.

In the present invention, the tilt alignment layer can be produced by forming a film from a solution dissolving a composition comprising the above-mentioned liquid crystal material (liquid crystal polymer) and if necessary a low molecular compound described below in a solvent, followed by removing the solvent, irradiating a linear polarized UV light, and heating the irradiated film.

The homeotropic alignment layer, the optical alignment layer, and the tilt alignment layer formed by the above method can be subjected to further non-polarized UV irradiation to fix alignment in each layer.

(Formation of Laminate)

The optical film laminate of the present invention can be produced by forming a homeotropic alignment layer by the above-mentioned method, then forming an optical alignment layer or a tilt alignment layer directly on the homeotropic alignment layer by the above-mentioned method; or forming an optical alignment layer or a tilt alignment layer, then forming a homeotropic alignment layer directly on the optical alignment layer or the tilt alignment layer. Accordingly, the optical film laminate comprising a homeotropic alignment layer and a layer selected from the group consisting of an optical alignment layer, a tilt alignment layer can be produced without adhesive. Hereinafter, in this specification, the method forming a homeotropic alignment layer, then forming an optical alignment layer or a tilt alignment layer is explained more precisely.

(Polymer Forming Homeotropic Alignment Layer)

Preferable examples of the polymer used for forming a homeotropic alignment layer in the present invention include a polymer polymerized from a monomer having a side chain shown in the following chemical formulae C1, C2, or C3.

[C1]

(1)

[C2]

(2)

In the above formulae C1 and C2, each of n and m independently denotes an integer of 1 to 12, each of X and Y independently denotes none, —COO, —OCO—, —N═N—, —C═C— or —$C_6H_4$—; $W_1$ denotes cinnamoyl group, chalcone group, cinnamylidene group, biphenylacryloyl group, furylacryloyl group, naphthylacryloyl group, the derivatives thereof, —H, —OH, or —CN; $W_2$ denotes cinnamoyl group, chalcone group, cinnamylidene group, biphenylacryloyl group, furylacryloyl group, naphthylacryloyl group, the derivatives thereof, —H, —OH, or —CN.

Among the above described side chains, the monomer in which $W_1$ and $W_2$ have the side chain of —H, —OH, or —CN does not show photosensitivity. However, when using this material, the liquid crystal polymer having a photosensitive group used in the present invention can be obtained by copolymerizing the above monomer with a monomer having a photosensitive group in the side chain. In the copolymerization, higher the proportion of the monomer represented by the above formula not showing photosensitivity is, easier obtaining a homeotropically-aligned polymer is. The proportion of the copolymerizable monomer can be suitably determined depending on the balance between homeotropic alignment and liquid crystallinity. In this case, as the liquid crystal monomer having a photosensitive group in the side chain, the preferable one includes a monomer having the same or similar chemical structure with the liquid crystal monomer used to form the below-mentioned optical alignment or tilt alignment layer from the viewpoint to increase adherence in the interface between the homeotropic alignment layer and an optical alignment or tilt alignment layer.

[C3]

(3)

In the formula C3, s denotes 0 or 1, t denotes an integer of 1 to 3, and R denotes H, an alkyl group, an alkyloxy group, or a halogen.

The liquid crystal polymer layer can be formed on a support by coating a coating solution dissolving a liquid crystal polymer formed from a monomer unit having a side chain represented by the above-formula C1 to C3, and if necessary a low molecular compound and other component (e.g., polymerization catalyst etc.) in an appropriate solvent, followed by removing the solvent.

As a solvent, there may be mentioned dioxane, dichloroethane, cyclohexanone, toluene, tetrahydrofuran, o-dichlorobenzene, methyl ethyl ketone, methyl isobutyl ketone and the like. These solvents are used singly or in combination of two or more. After applying the coating liquid on the support, the solvent is removed to make the coating layer dried. In this drying process, the layer formed begins to show a homeotropic alignment. The homeotropic alignment is enhanced by heating after the drying process. The drying process may be performed at an ordinary temperature or under heating to a temperature below the isotropic-phase transition temperature of the material. In addition, depending on the material, the homeotropic alignment may be shown on the surface of the support film.

The support film can be suitably chosen from various polymer films to be used. Examples of the support film may include a polyethylene-terephthalate film; a cellulose-based film such as a diacetyl cellulose, and a triacetyl cellulose film; a polycarbonate film such as a bisphenol A/carbonic acid copolymer; a linear or branched polyolefin film such as a polyethylene, a polypropylene, and an ethylene/propylene copolymer; a polyamide film, an polyimide film, a polysulfone film, and others.

The solution dissolving a liquid crystal polymer containing a polymer unit having a side chain represented by the chemical formulas 1 to 3 in the above-mentioned solvent is coated on the support by a coating method, such as spin coating, roller coating, screen printing, knife coating and spray coating, so that the coated film has a predetermined thickness. After coating, the coated film is dried to remove the solvent, and then heated at a temperature of 80 to 130° C., preferably 100 to 120° C. After cooling the film a homeotropic alignment layer can be formed. When a polarized UV light is irradiated to the homeotropic alignment layer formed as mentioned above, the homeotropic alignment is not affected by the UV light, resulting in maintaining the homeotropic alignment of the layer. Although the homeotropic alignment layer formed as mentioned above can fix the homeotropic alignment by irradiation of the non-polarized UV light, the irradiation should be performed after laminating an optical alignment layer or a tilt alignment layer as described below.

(Formation of Optical Alignment Layer and Tilt Alignment Layer)

On the homeotropic alignment layer formed as mentioned above, is coated a liquid crystal polymer solution dissolving in a solvent a liquid crystal polymer containing a unit having a side chain represented by the above-mentioned formulas C1 to C3, preferably the same liquid crystal polymer with the polymer constituting the homeotropic alignment layer. After coating, the coated film is dried to remove the solvent without heating, and then irradiated by a linear polarized UV light. The irradiated film is heated to form an optical alignment layer or a tilt alignment layer, followed by irradiated by an un-polarized UV light so as to fix this alignment.

Moreover, an optical alignment layer or a tilt alignment layer of a liquid crystal polymer different from the liquid crystal polymer containing a unit having a side chain represented by the above-mentioned formulas C1 to C3 can be formed by the above-mentioned method on the homeotropic alignment layer formed as mentioned above. Such liquid crystal polymers capable of forming an optical alignment layer or a tilt alignment layer may include liquid crystal polymers disclosed by the present applicant in JP Laid-open Patent Publications No. 11-189665, No. 2002-202409, No. 2004-170595, No. 2005-232345, etc. In particular, the preferable liquid crystal polymers include liquid crystal polymers having a similarity in chemical structure to the liquid crystal polymer constituting a homeotropic alignment layer because of good adhesion in the interface between both layers. For example, when cinnamoyl group is used as a photosensitive group of both the liquid crystal polymer constituting the homeotropic alignment layer and the liquid crystal polymer constituting the optical alignment or tilt alignment layer, each of the double bonds in the opposing cinnamoyl groups is open to form a cyclobutane linkage (as shown in formula C4 below). Accordingly, it is considered that the firm bonding can be formed in the interface between both layers due to the same dimerization reaction therein.

[C4]

(4)

(Low Molecular Material)

In the present invention in order to enhance the alignment in the optical alignment layer or the tilt alignment layer, the optical alignment layer or the tilt alignment layer according to the present invention is preferably formed by using a liquid crystal polymer having the above-mentioned photosensitive group in combination with a low molecular material to be mixed, followed by irradiating the mixture with a linear polarized UV light. As such a low molecular material, preferable one may include a compound exhibiting liquid crystal property, the compound having a substituent group such as biphenyl, terphenyl, phenyl benzoate and azobenzene, known as a mesogenic component, and a functional group such as allyl, acrylate, methacrylate, and cinnamic group (or the derivative thereof) bonded to the substituent group through the above bending component. These low molecular materials can be used singly or in combination with two or more. The proportion of the low molecular material to be added relative to the liquid crystal polymer is preferably 5 to 50% by weight, and more preferably 10 to 30% by weight. When such a low molecular material is added, photosensitizers such as a benzoin derivative (e.g., benzoin methyl ether, benzoin isopropyl ether, and $\alpha,\alpha$-dimethoxy-$\alpha$-phenylacetophenone); a benzophenone derivative (e.g., benzophenone, 2,4-dichlorobenzophenone, methyl o-benzoyl benzoate, 4,4'-bis(dimethylamino)benzophenone, and 4,4'-bis(diethylamino) benzophenone in order to promote the polymerization of the low molecular material.

(Linear Polarized UV Light Irradiation)

A solution dissolving a liquid crystal polymer having a photosensitive group, or a mixture of the above polymer and a low molecular material in a solvent, such as dioxane, dichloroethane, cyclohexanone, toluene, tetrahydrofuran, o-dichlorobenzene, methyl ethyl ketone, and methyl isobutyl ketone is coated on a homeotropic alignment layer and dried to form a film. The drying process may be performed at an ordinary temperature, or, depending on the material, under heating at a temperature of 60° C. or lower. The film formed under too high temperature may become cloudy.

Subsequently, a linear polarized UV light is irradiated on the formed film. As an ultraviolet source to be used, there may be mentioned mercury excitation light sources such as a low pressure mercury vapor lamp, a medium pressure mercury vapor lamp, or a high pressure mercury vapor lamp; or xenon light sources. The linearly polarized light can be acquired by transmitting the light from the light source through a polarizing filter and/or a polarizing prism. In the present invention when ultraviolet is irradiated from the slanting angle, the UV light source is set perpendicularly to the horizontal surface of the film. Then the film to be irradiated is inclined within the range of 0°<X<85° more preferably within the range of 5°<X<60°, relative to the direction of horizontal surface. According to such inclined irradiation, a tilt alignment layer having an inclined optical axis of preferably 0°<Y<45°, more preferably 2°<Y<40° can be obtained. The degree of tilt alignment is selected according to the light compensation of the film to be desired.

According to this irradiation, the optical axis of the liquid crystal polymer is uniaxially or biaxially aligned, or tilt-aligned. In order to proceed this optical reaction, it is necessary to use the light for irradiation having a wavelength by which the photosensitive group of the polymer can react. The wavelength, being selected depending on the side chain of the polymer, is generally 200 to 500 nm, and preferably 250 to 400 nm in many cases in view of high effectiveness of the light. Even if the linear polarized UV light is irradiated, the alignment of the homeotropic alignment layer is not substantially affected.

(Heating After Linearly Polarized UV Light Irradiation)

After polarized UV light irradiation to the film, the film is heated to make un-reacted side chains of the polymer and low molecular materials re-aligned in the same direction as the photo-reacted side chains of the polymer by an action of molecule movement in the film. As the result, in the whole film, the optical axis of the side chain of the polymer and the low molecular materials is aligned perpendicularly both to the electric-field oscillating direction of the irradiated linearly polarized light and to the irradiated light direction, resulting in induction of the birefringence so as to obtain an optical alignment layer or a tilt alignment layer. Heating after polarized UV light irradiation promotes this re-alignment. The heating temperature may be preferably not higher than a phase transition temperature of the material constituting the homeotropic layer.

If the film heated after irradiation as described above or the film irradiated under heating to be aligned is cooled until a temperature of not higher than the softening point of the polymer, the polymer molecules are frozen to give an optical alignment layer or a tilt alignment layer. The film may be preferably cooled with leaving the film as it is. If the film is too rapidly cooled, the re-alignment of the film may be deteriorated.

(Un-Polarized UV Light Irradiation)

Subsequently, an un-polarized UV light is irradiated to the optical alignment layer or the tilt alignment layer. When the un-polarized UV light is irradiated to the layer, the liquid crystal polymer molecules still having an un-reacted photosensitive group in the layer will react to fix the alignment of the layer, resulting in forming the stable optical alignment or tilt alignment layer as well as fixing the alignment of the homeotropic alignment layer. Moreover, it is thought that the photosensitive groups of liquid crystal polymers constituting each of the layers photo-react with each other in the interface between the homeotropic alignment layer and the optical alignment or tilt alignment layer so as to achieve high adhesion between both layers. It should be noted that although un-polarized ultraviolet radiation is usually irradiated without heating, the irradiation may be performed under heating when a phase difference value needs to be adjusted (lowered).

Although the optical alignment layer can be formed as mentioned above, depending on selection of the side chain and main chain of the liquid crystal polymer to be used, formulation of a low-molecular compound, selection of a solvent, drying conditions, ultraviolet irradiation conditions, etc., the obtained optical alignment layer may show not only an optical biaxiality but an optical uniaxiality (i.e., homogeneous alignment).

The optical film laminate of the present invention can be formed by forming an optical alignment layer or a tilt alignment layer, without adhesive, directly on a homeotropic alignment layer as mentioned above. The optical film laminate formed on the support is separable from a support film by transferring the laminate on a polarizing plate or a liquid crystal cell which constitutes a liquid crystal panel by using a pressure-sensitive adhesive.

(Thickness of Homeotropic Alignment Layer, Optical Alignment Layer, and Tilt Alignment Layer)

Each of the thicknesses of a homeotropic alignment layer, an optical alignment layer, and a tilt alignment layer may be preferably within the range between 0.3 and 3 µm and more preferably within the range between 0.5 and 2.5 µm.

According to the present invention, since the optical film laminate comprising a homeotropic alignment layer and an optical alignment or tilt alignment layer is capable of having such a small thickness of 0.6 to 6 μm, the thinner display can be attained compared to a conventional liquid crystal display comprising an conventional optical compensation film (at the thinnest, the film has a thickness of 15 μm).

From the viewpoint of the peeling resistance of the optical film laminate concerning the present invention, both the photosensitive group of the photosensitive liquid crystal polymer constituting the homeotropic alignment layer and the photosensitive group of the liquid crystal polymer constituting the optical alignment or tilt alignment layer may be a photosensitive group which reacts with each other when exposed to light. More preferably both the photosensitive groups of the both layers are the same photosensitive group to achieve firmer adhesion between layers because adjacent photosensitivity groups of the polymers in each of the layers can make a chemical bonding via UV irradiation in the interface between the homeotropic alignment layer and the optical alignment or tilt alignment layer. It should be noted that among the above-mentioned photosensitive groups, photosensitive groups such as cinnamoyl group, chalcone group, cinnamylidene group can react with each other; also photosensitive groups containing acryloyl groups such as biphenyl acryloyl group can react with each other.

(Liquid Crystal Display Panel)

A liquid crystal display panel comprises the above-mentioned optical film laminate, a polarizing plate, and a liquid crystal cell. As the polarizing plate and the liquid crystal cell, already known devices can be used. As the polarizing plate a uniaxially stretched film can be used the film comprising a polyvinyl alcohol as a main component and containing iodine or dichroic dye. Moreover, as a liquid crystal cell, there may be mentioned various liquid crystal cells such as a transmissive type, a reflective type, and a semi-transmissive type. Examples of the liquid crystal alignment mode in a liquid crystal cell include TN type, STN type, VA (vertical alignment) type, MVA (multi-domain vertical alignment) type, OCB (optically compensated bend) type, ECB (electrically controlled birefringence) type, HAN (hybrid-aligned nematic) type, IPS (inch-plane switching), bistability nematic (bistable nematic) type, ASM (Axially symmetric aligned microcell) type, half-tone gray scale type, ferroelectric liquid crystal, and antiferroelectric liquid crystal, and others.

(Configuration of Liquid Crystal Panel Composition Element)

Figure 3A:
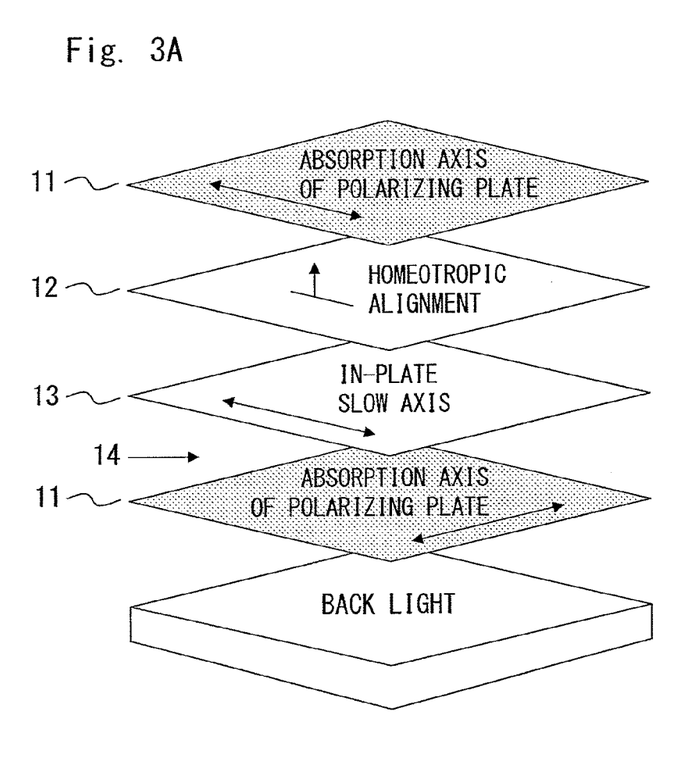
FIG. 3A is a schematic view showing an example of a configuration of a polarizing plate and an optical film laminate in the liquid crystal panel of the present invention.
Figure 3B:
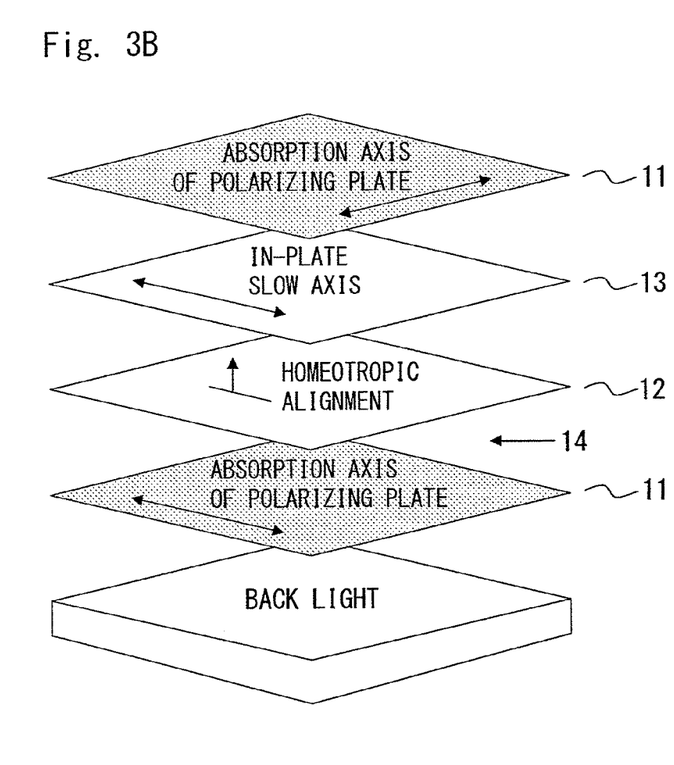
FIG. 3B is a schematic view showing another example of a configuration of a polarizing plate and an optical film laminate in the liquid crystal panel of the present invention.

FIGS. 3A and 3B show examples of a configuration of a liquid crystal panel of the present invention comprising an optical film laminate (comprising a positive C plate and a layer selected from the group consisting of an optical alignment layer formed from a positive A or optically biaxial plate and a tilt alignment layer formed from an O plate) and a polarizing plate.

The optical film laminate is mounted between one of the two polarized plates 11, 11 (on the visible side, i.e., not on the backlight side), and the position 14 of a liquid crystal cell (not shown). In the embodiment of FIG. 3A, the positive C plate (homeotropic alignment layer) 12 is mounted on the visible side of polarizing plate 11. In the embodiment of FIG. 3B, the optical alignment or tilt alignment layer 13 is mounted on the visible side of the polarizing plate 11. In the embodiment of FIG. 3A, the absorption axis of the visible side of the polarizing plate 11 is in parallel to the in-plane slow axis of the optical alignment or tilt alignment layer 13. In the embodiment of FIG. 3B, the absorption axis of the visible side of the polarizing plate 11 is perpendicular to the in-plane slow axis of the optical alignment or tilt alignment layer 13. It should be noted that although FIGS. 3A and 3B showed the examples in which the optical film laminate of the present invention is mounted on the polarizing plate of the visible side, the optical film laminate may be mounted not only on the polarizing plate of the visible side but also on the polarizing plate of the backlight side.

(Use of Liquid Crystal Display Panel)

The liquid crystal display panel of the present invention comprising the above-mentioned optical film laminate and one or more polarizing plates can be used for liquid crystal displays, such as personal computers, liquid crystal televisions, cellular phones, and Personal Digital Assistants (PDAs). Among them, the liquid crystal panel of the present invention is suitably used for liquid crystal displays, especially for liquid crystal displays of IPS mode. When using an optical alignment layer, it is especially suitable for a liquid crystal television; when using a tilt alignment layer, it is especially suitable for a cellular phone etc.

EXAMPLES

Hereinafter, the present invention will be demonstrated by way of some examples, which are not to be construed as limiting the scope of the present invention. The method for synthesizing materials used in Example of the present invention and Comparative Example is shown below. In addition, the determination whether the sample obtained by the Examples and the Comparative Examples is a positive C plate, a positive A plate, a biaxial plate, or an O plate is conducted as described below.

(Monomer 1)

A mixture of 4,4'-biphenyldiol and 2-chloroethanol was heated under alkaline conditions to synthesize 4-hydroxy-4'-hydroxyethoxybiphenyl. Then, this product was reacted under alkaline conditions with 1,6-dibromohexane to synthesize 4-(6-bromohexyloxy)-4'-hydroxyethoxybiphenyl. Thereafter, it was reacted with lithium methacrylate to synthesize a monomer 1 represented by the formula C5.

[C5]

(5)

(Monomer 2)

To the monomer, was added cinnamoyl chloride under basic conditions to synthesize a monomer 2 represented by the formula C6.

[C6]

(Monomer 3)

A mixture of p-coumaric acid and 6-chloro-1-hexanol was heated under alkaline conditions to synthesize 4-(6-hydroxyhexyloxy) cinnamic acid.

To this product was added large excess of methacrylic acid in the presence of p-toluenesulfonic acid, followed by esterification of the mixture to synthesize a monomer 3 represented by the formula C7.

[C7]

(Low Molecular Material 1)

A mixture of 4,4'-biphenyldiol and 6-bromohexanol was heated under alkaline conditions to synthesize 4,4'-bis(6-bromohexyloxy)biphenyl. To this product was added methacryloyl chloride to react under basic conditions. Then the reactant was recrystallized to synthesize a low molecular material 1 represented by the formula C8.

[C8]

(Polymer 1)

The monomers 1 and 2 were dissolved in tetrahydrofuran in the molar ratio of 3:7. Then, AIBN (azobisisobutyronitrile) was added thereto as a reaction initiator for polymerization at 70° C. for 24 hours so as to obtain a photosensitive polymer 1. The polymer 1 indicated liquid crystallinity.

(Polymer 2)

The monomer 2 was dissolved in tetrahydrofuran. Then, AIBN (azobisisobutyronitrile) was added thereto as a reaction initiator for polymerization at 70° C. for 24 hours so as to obtain a photosensitive polymer 2. The polymer 2 indicated liquid crystallinity.

(Polymer 3)

The monomer 3 was dissolved in dioxane. Then, AIBN (azobisisobutyronitrile) was added thereto as a reaction initiator for polymerization at 70° C. for 24 hours so as to obtain a photosensitive polymer 3. The polymer 3 indicated liquid crystallinity.

(Method for Determining Whether Positive C Plate, Positive A Plate, Biaxial Plate, or O Plate)

By using an automatic birefringence analyzer, angle dependability of a phase difference value was calculated through the crystal rotation method. According to the angle dependency, the determination whether the obtained sample is a positive C plate, a positive A plate, a biaxial plate, or an O plate was conducted.

Example 1

The polymer 1 was dissolved in cyclohexanone, and thereto was added 4,4'-bis(diethylamino)benzophenone available from Tokyo Chemical Industry Co., Ltd. in the proportion of 0.02 part by weight relative to 1 part by weight of the polymer 1 to prepare a solution 1. The solution 1 was spin-coated at a thickness of about 1.5 μm onto a polyethylene terephthalate film (PET film). After drying the resultant material at a room temperature (about 25° C.), the material was heated to 100° C. followed by cooled to form a first coated layer. Next 4.2% by weight of the polymer 2 and 0.8% by weight of the low molecular material 1 were dissolved in toluene, and thereto was added 4,4'-bis(diethylamino)benzophenone available from Tokyo Chemical Industry Co., Ltd. in the proportion of 0.02 part by weight relative to 1 part by weight of the total amount of the polymer 2 and the low molecular material 1 to prepare a solution 2. The solution 2 was spin-coated at a thickness of about 1.8 μm onto the first coated layer and dried to form a second coated layer on the first coated layer. Here, without light irradiation to the first coated layer as well as without fixing its alignment (photosensitive groups are still un-reacted), the second coated layer was formed on the first coated layer.

Subsequently, light from a high pressure mercury vapor lamp is converted into a linear polarized light by using Gran-Taylor prism, and then the linear polarized light is irradiated to the coat layers for 300 seconds. The irradiated material is heated at 100° C., followed by gradually cooled for 30 minutes to the room temperature to induce the alignment. Thereafter, light from a high pressure mercury vapor lamp is irradiated without converting into linear polarized light to the layers for 1,500 seconds in order to fix the alignment.

Thus obtained coated layers could be transferred from the PET support to a liquid crystal cell or a polarizing plate by using a pressure sensitive adhesive. Moreover, the layers were confirmed to have the optical characteristics of a laminate comprising a positive C plate (homeotropic alignment layer) and a positive A plate (optical alignment layer). The optical leakage can be decreased when viewed at an oblique angle through two polarizing plates crossing at right angle to each other. Further, in order to confirm the adhesion of the interface between the first and second coated layers, it was tried whether the delamination was occurred between two layers by using Scotch tape. Delamination in the interface was not observed, but good adhesion between layers was confirmed.

Example 2

The polymer 3 was dissolved in 1,4-dioxane to prepare a solution 3. The solution 3 was spin-coated at a thickness of about 1.5 μm onto a polyethylene terephthalate film (PET film). After drying the resultant material at a room temperature (about 25° C.), the material was heated to 130° C. followed by cooled to form a first coated layer. Again the solution 3 was spin-coated at a thickness of about 2.0 μm onto the first coated layer and dried to form a second coated layer on the first coated layer. Here, without light irradiation to the first coated layer and without fixing its alignment (photosensitive groups are still un-reacted), the second coated layer was formed on the first coated layer.

Subsequently, light from a high pressure mercury vapor lamp is converted into a linear polarized light by using Gran-Taylor prism, and then the linear polarized light is irradiated to the coat layers for 300 seconds. The irradiated material is heated at 130° C., followed by gradually cooled for 30 minutes to the room temperature to induce the alignment. Thereafter, light from a high pressure mercury vapor lamp is irradiated without converting into linear polarized light to the layers for 900 seconds in order to fix the alignment.

Thus obtained coated layers could be transferred from the PET support to a liquid crystal cell or a polarizing plate by using a pressure sensitive adhesive. Moreover, the layers were confirmed to have the optical characteristics of a laminate comprising a positive C plate and a layer having an in-plane anisotropy. Further, in order to confirm the adhesion of the interface between the first and second coated layers, it was tried whether the delamination was occurred between two layers by using Scotch tape. Delamination in the interface was not observed, but good adhesion between layers was confirmed.

Comparative Example 1

The polymer 1 was dissolved in cyclohexanone, and thereto was added 4,4'-bis(diethylamino)benzophenone available from Tokyo Chemical Industry Co., Ltd. in the proportion of 0.02 part by weight relative to 1 part by weight of the polymer 1 to prepare a solution 1. The solution 1 was spin-coated at a thickness of about 1.5 μm onto a polyethylene terephthalate film (PET film). After drying the resultant material at a room temperature (about 25° C.), the material was heated to 100° C. followed by being cooled for 30 minutes to give a coated layer. Subsequently, light from a high pressure mercury vapor lamp is irradiated without converting into linear polarized light to the layer for 1,500 seconds to fix the alignment of the layer so as to form a first coated layer (homeotropic alignment layer). Next 4.2% by weight of the polymer 2 and 0.8% by weight of the low molecular material 1 were dissolved in toluene, and thereto was added 4,4'-bis(diethylamino)benzophenone available from Tokyo Chemical Industry Co., Ltd. in the proportion of 0.02 part by weight relative to 1 part by weight of the total amount of the polymer 2 and the low molecular material 1 to prepare a solution 2. The solution 2 was spin-coated at a thickness of about 1.8 μm onto the first coated layer and dried to form a second coated layer on the first coated layer.

Subsequently, light from a high pressure mercury vapor lamp is converted into a linear polarized light by using Gran-Taylor prism, and then the linear polarized light is irradiated to the coat layers for 300 seconds. The irradiated material is heated at 100° C., followed by gradually cooled for 30 minutes to the room temperature to induce the alignment. Thereafter, light from a high pressure mercury vapor lamp is irradiated without converting into linear polarized light to the layers for 1,500 seconds in order to fix the alignment.

Thus obtained coated layers could be transferred from the PET support to a liquid crystal cell or a polarizing plate by using a pressure sensitive adhesive. Moreover, the layers were confirmed to have the optical characteristics of a laminate comprising a positive C plate and a positive A plate. The optical leakage can be decreased when viewed at an oblique angle through two polarizing plates crossing at right angle to each other. However, delamination in the interface was observed when it was tried whether the delamination was occurred between two layers by using Scotch tape in order to confirm the adhesion of the interface between the first and second coated layers. The resultant was impractical because of the low adhesion in the interface.

Comparative Example 2

The polymer 3 was dissolved in 1,4-dioxane to prepare a solution 3. The solution 3 was spin-coated at a thickness of about 1.5 μm onto a polyethylene terephthalate film (PET film). After drying the resultant material at a room temperature (about 25° C.), the material was heated to 130° C. followed by cooled for 30 minutes to give a coated layer. Subsequently, light from a high pressure mercury vapor lamp is irradiated without converting into linear polarized light to the layer for 1,500 seconds to form a first coated layer (homeotropic alignment layer). Thereafter, again the solution 3 was spin-coated at a thickness of about 2.0 μm onto the first coated layer and dried to form a second coated layer on the first coated layer.

Subsequently, light from a high pressure mercury vapor lamp is converted into a linear polarized light by using Gran-Taylor prism, and then the linear polarized light is irradiated to the coat layers for 300 seconds. The irradiated material is heated at 130° C., followed by gradually cooled for 30 minutes to the room temperature to induce the alignment. Thereafter, light from a high pressure mercury vapor lamp is irradiated without converting into linear polarized light to the layers for 900 seconds in order to fix the alignment.

Thus obtained coated layers could be transferred from the PET support to a liquid crystal cell or a polarizing plate by using a pressure sensitive adhesive. Moreover, the layers were confirmed to have the optical characteristics of a laminate comprising a positive C plate and a layer having an in-plane anisotropy. However, delamination in the interface was observed when it was tried whether the delamination was occurred between two layers by using Scotch tape in order to confirm the adhesion of the interface between the first and second coated layers. The resultant was impractical because of the low adhesion in the interface.

Example 3

In Example 1, without light irradiation to the first coated layer as well as without fixing its alignment (photosensitive groups are still un-reacted), a second coated layer is formed on the first coated layer. Thereafter, the coated layers were arranged at an inclined angle of 20° to a horizontal plane and irradiated with linear polarized light converted from light from a high pressure mercury vapor lamp for 300 seconds in the perpendicular direction to the horizontal plane (i.e., electric-field oscillating plane of light intersects perpendicularly to the tilt axis of the film). The irradiated material is heated at 100° C., followed by being cooled gradually for 30 minutes to the room temperature to induce the alignment. Further, light from a high pressure mercury vapor lamp is irradiated without converting into linear polarized light to the layers for 1,500 seconds in order to fix the alignment.

Thus obtained coated layers could be transferred from the PET support to a liquid crystal cell or a polarizing plate by using a pressure sensitive adhesive. Moreover, the layers were confirmed to have the optical characteristics of a laminate comprising a positive C plate (homeotropic alignment layer) and a tilt alignment layer (O plate) (tilt-angle; 10°). Further, in order to confirm the adhesion of the interface between the first and second coated layers, it was tried whether the delamination was occurred between two layers by using Scotch tape. Delamination in the interface was not observed, but good adhesion between layers was confirmed.

Example 4

The polymer 1 was dissolved in cyclohexanone, and thereto was added 4,4'-bis(diethylamino)benzophenone available from Tokyo Chemical Industry Co., Ltd. in the proportion of 0.02 part by weight relative to 1 part by weight of the polymer 1 to prepare a solution 1. The solution 1 was spin-coated at a thickness of about 1.5 μm onto a polyethylene terephthalate film (PET film). After drying the resultant material at a room temperature (about 25° C.), the material was heated to 100° C. followed by being cooled for 30 minutes to give a coated layer. Subsequently, light from a high pressure mercury vapor lamp is irradiated without converting into linear polarized light to the layer for 1,500 seconds to fix the alignment of the layer so as to form a first coated layer (homeotropic alignment layer). Next 4.2% by weight of the polymer 2 and 0.8% by weight of the low molecular material 1 were dissolved in toluene, and thereto was added 4,4'-bis(diethylamino)benzophenone available from Tokyo Chemical Industry Co., Ltd. in the proportion of 0.02 part by weight relative to 1 part by weight of the total amount of the polymer 2 and the low molecular material 1 to prepare a solution 2. The solution 2 was spin-coated at a thickness of about 1.8 μm onto the first coated layer and dried to form a second coated layer on the first coated layer.

Thereafter, the coated layers were arranged at an inclined angle of 20° to a horizontal plane and irradiated with linear polarized light converted from light from a high pressure mercury vapor lamp for 300 seconds in the perpendicular direction to the horizontal plane (i.e., electric-field oscillating plane of light intersects perpendicularly to the tilt axis of the film). The irradiated material is heated at 100° C., followed by gradually cooled for 30 minutes to the room temperature to induce the alignment. Further, light from a high pressure mercury vapor lamp is irradiated without converting into linear polarized light to the layers for 1,500 seconds in order to fix the alignment.

Thus obtained coated layers could be transferred from the PET support to a liquid crystal cell or a polarizing plate by using a pressure sensitive adhesive. Moreover, the layers were confirmed to have the optical characteristics of a laminate comprising a positive C plate and an O plate.

However, when it was tried whether the delamination was occurred between two layers by using Scotch tape in order to confirm the adhesion of the interface between the first and second coated layers, the coated layers were separated more easily than Example 1, and were not sufficient from the viewpoint of adhesion.

INDUSTRIAL APPLICABILITY

As mentioned above, since an optical film having an optical compensation function with thinner thickness can be obtained by using the optical film laminate according to the present invention, such an optical film can contribute to achieve a thinner liquid crystal display. The liquid crystal panel of the present invention can be suitably used for liquid crystal displays, such as liquid crystal televisions or personal digital assistants.

As mentioned above, the preferred embodiments of the present invention are illustrated, but it is to be understood that other embodiments may be included, and that various additions, other changes or deletions may be made, without departing from the spirit or scope of the present invention.

EXPLANATIONS OF LETTERS OR NUMERALS

1: Optical film laminate
2: Positive A plate
3: Positive C plate
4: Interface
5: Optical film laminate
6: O plate
7: Positive C plate
8: Interface
11: Polarizing plate
12: Positive C plate (homeotropic alignment layer)
13: Optical alignment layer or tilt alignment layer
14: Location on which a liquid crystal cell is mounted

What is claimed is:

1. A method for producing an optical film laminate comprising:
   providing a positive C plate (layer A) comprising a homeotropic alignment layer of a liquid crystal material (or material A) having a photosensitive group, the layer not being subjected to alignment fixation;
   forming on the positive C plate, a positive A plate, an optically biaxial plate, or an O plate (layer B) of a liquid crystal material (or material B) having a photosensitive group, to obtain a laminate of the layer A and the layer B,
   irradiating an un-polarized UV light to the laminate so as to fix the alignment of the layer A and the layer B, as well as directly laminate and bond both layers without adhesive.

2. The method as claimed in claim 1, wherein the layer A is formed by applying a solution dissolving a material A in a solvent on a support film to form a coated layer, followed by drying and heating the coated layer.

3. The method as claimed in claim 1, wherein the layer B, is formed by applying a solution dissolving the material B in a solvent on the layer A to form a coated layer, followed by drying, and subsequently irradiating a linear polarized UV light.

4. The method as claimed in claim 1, wherein the photosensitive groups of both material A and material B are a photosensitive group reacting with each other when exposed to light.

5. The method as claimed in claim 4, wherein the photosensitive groups of both material A and material B are the same photosensitive group.

* * * * *